Oct. 6, 1942.  R. C. HOWELL  2,298,054
MOTOR VEHICLE
Original Filed Feb. 10, 1939    2 Sheets-Sheet 1

INVENTOR
ROY C. HOWELL
BY Frank S Greene
ATTORNEY

Oct. 6, 1942.   R. C. HOWELL   2,298,054
MOTOR VEHICLE
Original Filed Feb. 10, 1939   2 Sheets-Sheet 2
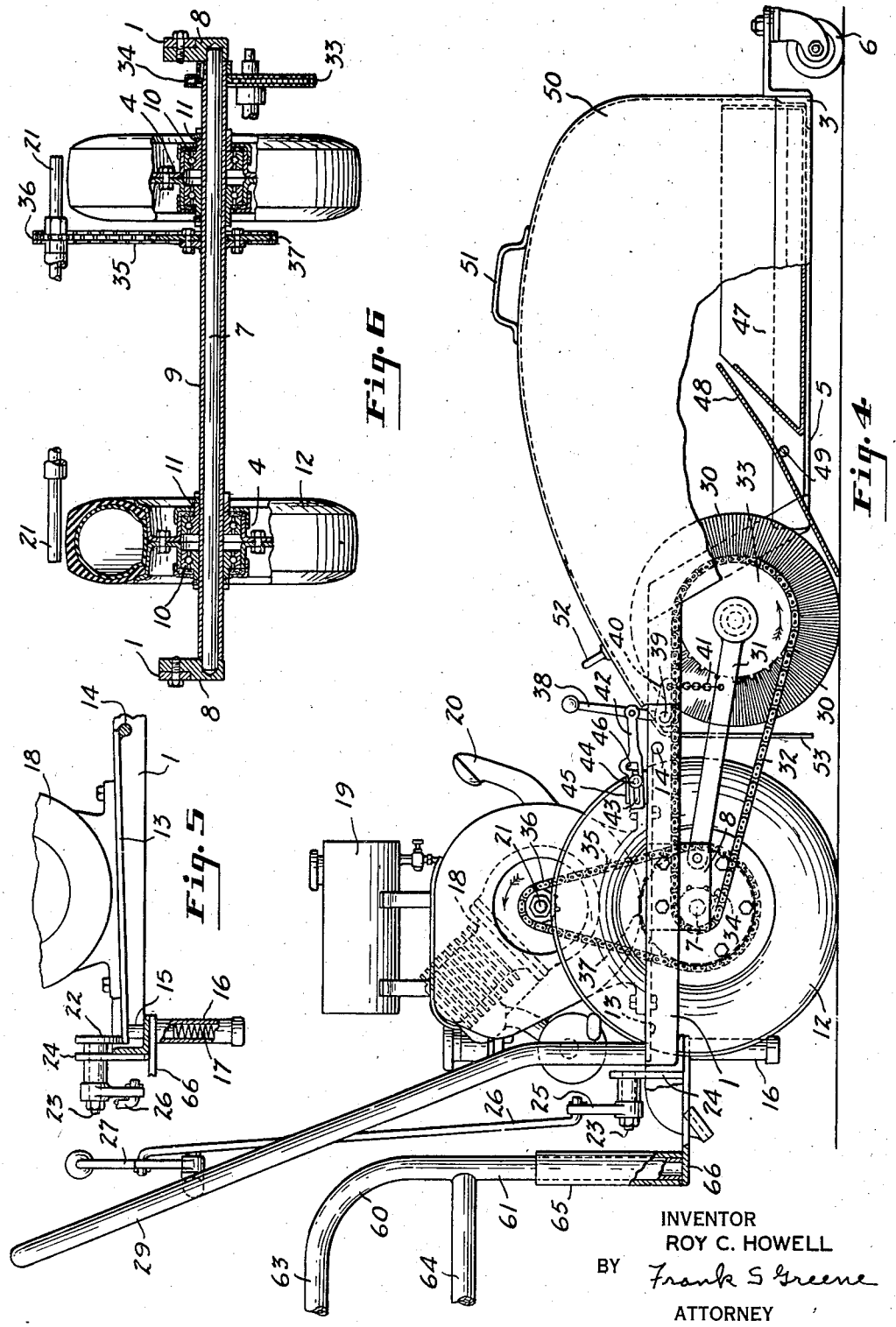
INVENTOR
ROY C. HOWELL
BY Frank S Greene
ATTORNEY Patented Oct. 6, 1942

2,298,054

UNITED STATES PATENT OFFICE 2,298,054

MOTOR VEHICLE

Roy C. Howell, Lakewood, Ohio

Substitute for abandoned application Serial No. 255,725, February 10, 1939. This application August 3, 1940, Serial No. 350,899

3 Claims. (Cl. 180—74)

This invention relates to motor vehicles and more particularly to motor vehicles of a type suitable for small dirigible machines such as a rotary floor sweeper or the like.

This application is a substitute for my application Serial No. 255,725, filed February 10, 1939.

The present invention has for its object to provide a motor driven vehicle of simple and inexpensive construction, which is provided with simple and convenient controlling means.

A further object of the invention is to provide a trailer upon which an operator may ride and by means of which the vehicle may be steered by the operator.

A further object of the invention is to provide a vehicle propelling mechanism and drive controlling means which comprises a minimum number of parts.

With the above and other objects in view the invention may be said to comprise a motor vehicle as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 4 is a side elevation of the sweeper;

Fig. 5 is a detail view showing the pivoted motor supporting platform; and

Fig. 6 is a section taken on the line indicated at 6—6 in Fig. 4.

Figures 1, 2, 3:
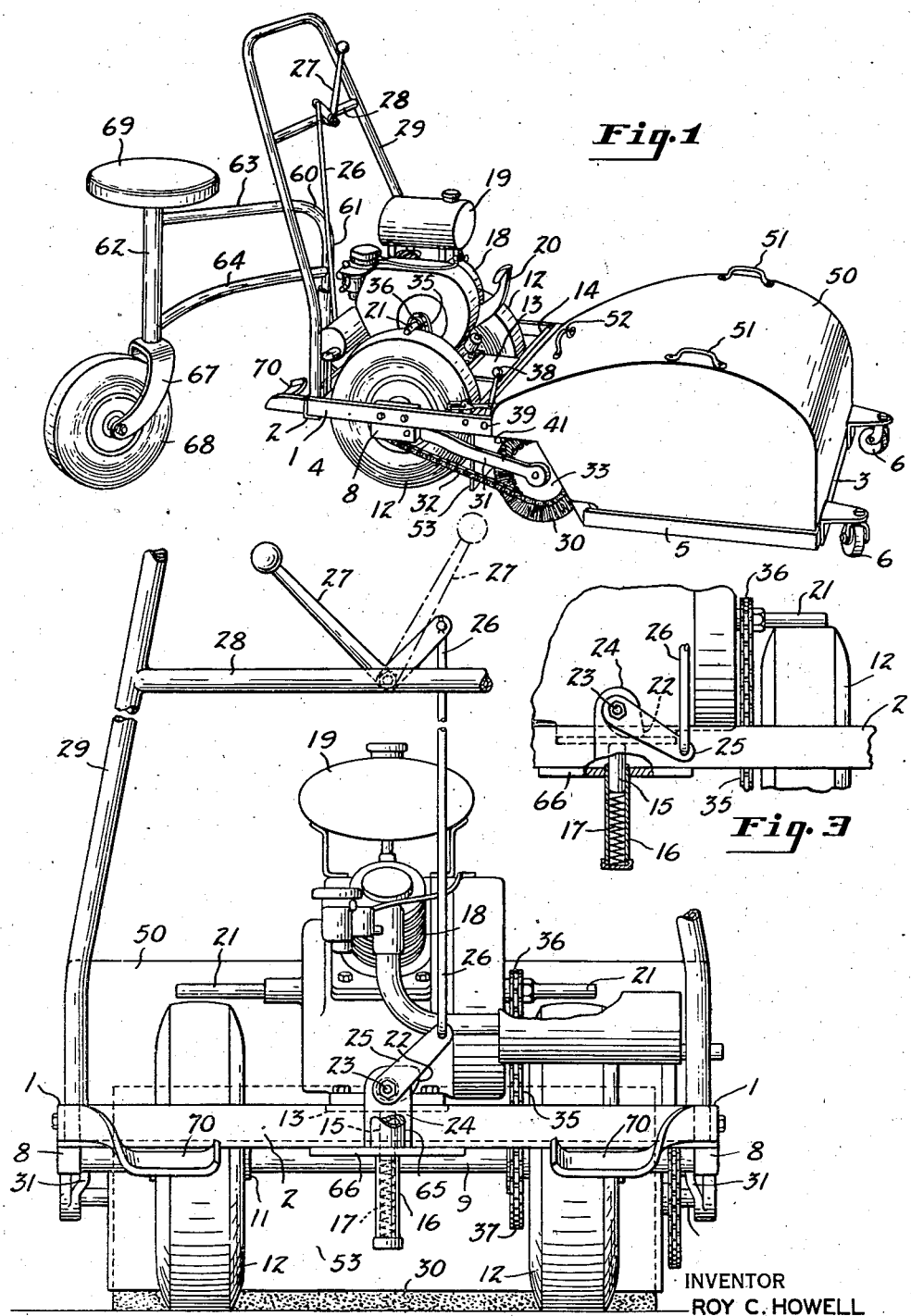
Figure 1 is a perspective view of a floor sweeper embodying the invention.
Fig. 2 is a fragmentary rear elevation of the machine, with the trailer omitted, showing the propelling motor in elevated position, with the traction wheels and driving mechanism disengaged.
Fig. 3 is a fragmentary rear elevation showing the motor lowered into driving position.

In the accompanying drawings the invention is shown applied to a motor vehicle which provides a support for a floor sweeper of the rotary brush type. The vehicle has a rectangular frame provided with side rails 1, a rear cross bar 2, and a front cross bar 3. The rear end of the vehicle is supported upon a pair of traction wheels 4. The vehicle frame has a depressed forward portion 5 supported on caster wheels 6 which are mounted at the front corners of the frame. The traction wheels 4 are supported upon an axle 7 which extends transversely between the side frame rails 1, forwardly of the rear cross bar 2, the ends of the axle 7 being supported by brackets 8 fixed to the side rails 1. Upon the axle 7 there is mounted a tubular shaft 9 which is rotatable upon the axle 7. The traction wheels 4 are rotatable upon the tubular shaft 9 and have ball bearings 10 interposed between the wheel hubs and tubular shaft 9, the bearings 10 having inner rings 11 fixed to the shaft 9. The traction wheels 4 are preferably provided with pneumatic tires 12.

Interposed between the traction wheels 4 and overlying the tubular shaft 9 there is a platform 13 which is supported at its forward end upon a transverse shaft 14 which provides a pivot about which the platform 13 may swing vertically. The rear end of the platform 13 is supported upon a plunger 15 which is slidable in a vertically disposed cylinder 16 attached to the rear cross bar 2. The cylinder 16 has a coil spring 17 mounted therein and bearing against the lower end of the plunger 15, the weight of the rear end of the platform 13 being imposed upon the spring 17 through the plunger 15. The platform 13 provides a support for a vehicle propelling motor 18. The motor 18 may be an internal combustion engine, and, as herein shown, is provided with the usual fuel tank 19 and starter lever 20. The motor has a crankshaft 21 which has axially aligned end portions projecting from opposite sides of the motor casing and overlying the peripheries of the pneumatic tires 12. The platform 13 is normally supported by the springs 17 in an elevated position in which the ends of the crankshaft 21 are held out of engagement with the pneumatic tires 12. For depressing the platform in opposition to the spring 17, a cam 22, carried by a shaft 23, journalled in a bracket 24 carried by the rear cross bar 2, is engageable with the upper side of the rear end of the platform 13. The shaft 23 has an arm 25 connected by a link 26 to a bell crank lever 27 carried by cross bar 28 of a U-shaped handle member 29 which is rigidly secured to the rear end of the vehicle frame. The bell crank lever 27 is mounted to swing laterally to either side of its vertical position and when positioned at one limit of movement, the cam 22 is in disengaged position and the springs 17 hold the motor 18 in elevated position with the shaft 21 out of engagement with the platform 13, as shown in full lines in Fig. 2.

When the lever 27 is swung to the right from the position shown in full lines in Fig. 2, to the dotted line position shown, the cam 22 is swung down against the platform 13, depressing the platform and bringing the shaft 21 into engagement with the peripheries of the tires 12. The shaft 21 bearing against the treads of the pneumatic tires 12 drives the traction wheels 4 in the direction to propel the vehicle forwardly. The pressure of the shaft 21 against the treads of the tires 12 causes an inward bowing of the portion of the treads engaged by the shaft so that the tires have a substantial arc of contact with the under side of the shaft and exert considerable pressure against the shaft so that there is little slippage between the shaft and tire treads.

A rotary brush 30 is mounted between the forward ends of a pair of arms 31 which are pivoted at their rear ends to the frame adjacent the axle 7. The brush 30 is driven by a sprocket chain 32 which runs over a sprocket 33 attached to the brush shaft and a sprocket 34 attached to the tubular shaft 9. The tubular shaft 9 is driven by the engine through a sprocket chain 35 running over a sprocket 36 secured to the motor shaft 21 and over a sprocket 37 secured to the tubular shaft, there being sufficient slack in the chain 35 to permit the vertical movement of the motor necessary to engage and disengage the shaft 21 from the treads of the tires 12. The brush 30 may be held in an elevated position out of engagement with the floor by means of a lever 38 attached to a cross shaft 39 which is journalled in the side rails 1, the shaft 39 having arms 40 adjacent its ends which are connected by chains 41 to the arms 31. For holding the brush 30 in elevated position, the lever 38 has a latch bar 42 pivoted thereto which is provided with a slot 43 which receives a pin 44 attached to a bracket 45 secured to the adjacent side rails 1. The slot 43 has an enlargement 46 at its forward end which permits the latch bar to drop over the pin 44 to latch the arm 31 in elevated position. On the depressed forward portion 5 of the vehicle frame there is mounted a removable dust pan 47. Forwardly of the dust pan there is an inclined apron 48 which extends from adjacent the top of the forward wall of the dust pan downwardly at an inclination to adjacent the floor immediately in front of the brush 30. The apron is pivotally mounted on a cross shaft 49 and may be so balanced that its forward edge rests lightly upon the floor surface. Brush 30 carried by the pivoted arms 31 is held by gravity upon the floor surface and has floating contact with the floor surface so that it will readily pass over any surface irregularity or projection on the floor surface. A hood 50, provided with handles 51 and 52, is mounted on the forward portion of the vehicle frame and covers the dust pan 47 and extends rearwardly over the top of the brush 30, the rear wall 53 of the hood being disposed vertically and immediately to the rear of the brush with its lower edge close to but slightly spaced above the floor. The hood can be readily lifted off the frame whenever desired, by means of the handles 51 and 52, to obtain access to the removable dust pan 53 to empty the same.

The vehicle is provided with a steering trailer which consists of a frame 60 having a front post 61 and a rear post 62. The frame 62 may be formed of tubular bars, the bar forming the front post 61 being bent rearwardly and extending to the upper portion of the rear post 62 to which it is rigidly attached. A tubular member 64 connects the posts 61 and 62 below the top portion 63. The post 61 fits in a cylindrical socket 65 carried by a bracket 66 attached to the rear cross bar 2 of the frame centrally thereof, the socket 65 and post 61 providing a vertical pivot about which the trailer may swing freely. The rear post 62 of the trailer frame is provided with a fork 67 at the lower end, which is rigidly attached to the post within which is mounted a supporting wheel 68 which is held by the fork in the plane of the trailer frame. At the upper end of the rear post 62 is mounted an operator's seat 69. The operator sits on the seat 69 with his feet upon foot rests 70 attached to the vehicle frame adjacent the rear corners and with his hands grasping the handle 29. So seated, the operator may readily change the angle of the trailer with respect to the main vehicle and thereby steer the vehicle.

The present invention provides a very simple and inexpensive motor vehicle for mechanisms such as the floor sweeper herein shown, since it eliminates controlling mechanisms such as the usual steering gear and drive controlling clutch, the movement of the machine being controlled wholly by means of a single shiftable lever which controls the propulsion of the vehicle.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A motor vehicle comprising a frame, an axle carried by the frame, a pair of spaced traction wheels mounted on said axle and provided with pneumatic tires, a supporting platform overlying said axle between the traction wheels and closely adjacent said axle and mounted upon the frame to swing about a horizontal axis parallel with the axle and forwardly thereof, a motor mounted upon said platform and having a shaft projecting laterally beyond opposite sides thereof and overlying the peripheral portions of the traction wheel tire treads substantially in vertical alignment with the axle, a spring engaging the under side of said platform for normally holding said platform in an elevated position in which said shaft is disengaged from the wheels, a cam mounted in the frame and engageable with said platform to depress the same in opposition to said spring, and means for operating said cam.

2. A motor vehicle comprising a frame having side rails, a transverse axle having its ends secured in said side rails, a tubular shaft rotatably mounted on said axle, spaced traction wheels rotatably mounted on said shaft and provided with pneumatic tires, a motor support overlying said tubular shaft between said wheels and mounted for vertical movement in the frame, said motor having a shaft projecting from opposite sides thereof and overlying peripheral portions of the traction wheel tire treads, means for lowering or raising said motor support to engage or disengage the shaft and traction wheels, and a driving connection from said motor shaft to said tubular shaft.

3. A motor vehicle comprising a frame, an axle mounted in the frame, a tubular power transmitting shaft rotatably mounted on said axle, a traction wheel rotatably mounted on said shaft, a motor carried by the frame, means for driving said traction wheel from said motor, and a separate driving connection from said motor to said shaft.

ROY C. HOWELL.